United States Patent
Shin et al.

(10) Patent No.: US 11,884,295 B2
(45) Date of Patent: Jan. 30, 2024

(54) APPARATUS AND METHOD FOR CONTROLLING AUTONOMOUS DRIVING OF VEHICLE

(71) Applicants: HYUNDAI MOTOR COMPANY, Seoul (KR); KIA MOTORS CORPORATION, Seoul (KR)

(72) Inventors: Ki Cheol Shin, Seongnam-si (KR); Hyun Kyu Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 221 days.

(21) Appl. No.: 17/074,993

(22) Filed: Oct. 20, 2020

(65) Prior Publication Data

US 2021/0179143 A1 Jun. 17, 2021

(30) Foreign Application Priority Data

Dec. 17, 2019 (KR) .................. 10-2019-0169289

(51) Int. Cl.
*B60W 60/00* (2020.01)
*B60W 30/095* (2012.01)
(Continued)

(52) U.S. Cl.
CPC ........ *B60W 60/0015* (2020.02); *B60W 30/09* (2013.01); *B60W 30/0953* (2013.01); *B60W 30/0956* (2013.01); *B60W 30/16* (2013.01); *B60W 40/10* (2013.01); *B60W 2554/4044* (2020.02); *B60W 2720/106* (2013.01)

(58) Field of Classification Search
CPC ............. B60W 60/0015; B60W 30/09; B60W 30/0953; B60W 30/0956; B60W 30/16; B60W 40/10; B60W 2554/4044; B60W 2720/106; B60W 2554/4042; B60W 2554/802; B60W 2554/806; B60W 2555/60; B60W 2720/103; B60W 2554/80; B60W 60/001; B60W 2050/0005; B60W 2050/0022; B60W 30/08; B60W 30/143; B60W 40/105; B60W 40/107; B60W 2520/10; B60W 2520/105; B60K 31/0008; B60K 2031/0033
See application file for complete search history.

(56) References Cited

U.S. PATENT DOCUMENTS

2004/0199327 A1* 10/2004 Isogai .................. B60T 7/22
701/301
2005/0080565 A1* 4/2005 Olney ............... B60K 31/0008
340/903

(Continued)

FOREIGN PATENT DOCUMENTS

KR 101315726 B1 10/2013

*Primary Examiner* — Nicholas Kiswanto
*Assistant Examiner* — Madison B Emmett
(74) *Attorney, Agent, or Firm* — Lempia Summerfield Katz LLC

(57) ABSTRACT

A method of controlling autonomous driving of a vehicle includes: selecting a target object ahead of the vehicle based on driving information, generating a velocity profile for maintaining a desired distance to the target object, calculating a desired acceleration based on the velocity profile and a delay time of the vehicle, and controlling an actuator of the vehicle based on the desired acceleration.

15 Claims, 13 Drawing Sheets

(51) Int. Cl.
*B60W 30/16* (2020.01)
*B60W 40/10* (2012.01)
*B60W 30/09* (2012.01)

(56) References Cited

U.S. PATENT DOCUMENTS

| | | | |
|---|---|---|---|
| 2014/0088789 A1* | 3/2014 | Jeon | B60W 30/19 |
| | | | 701/1 |
| 2014/0222259 A1* | 8/2014 | Yoshimoto | B61L 27/16 |
| | | | 701/20 |
| 2015/0203108 A1* | 7/2015 | Loria | B60W 50/0098 |
| | | | 701/1 |
| 2018/0237011 A1* | 8/2018 | Laurent | B60W 50/085 |
| 2019/0049959 A1* | 2/2019 | Gaither | B60W 50/085 |
| 2019/0135247 A1* | 5/2019 | Luo | B60T 8/172 |
| 2019/0283766 A1* | 9/2019 | Jensen | B60W 10/10 |
| 2020/0139971 A1* | 5/2020 | Bucht | B60W 30/18145 |
| 2020/0290611 A1* | 9/2020 | Tang | B60W 30/143 |

* cited by examiner

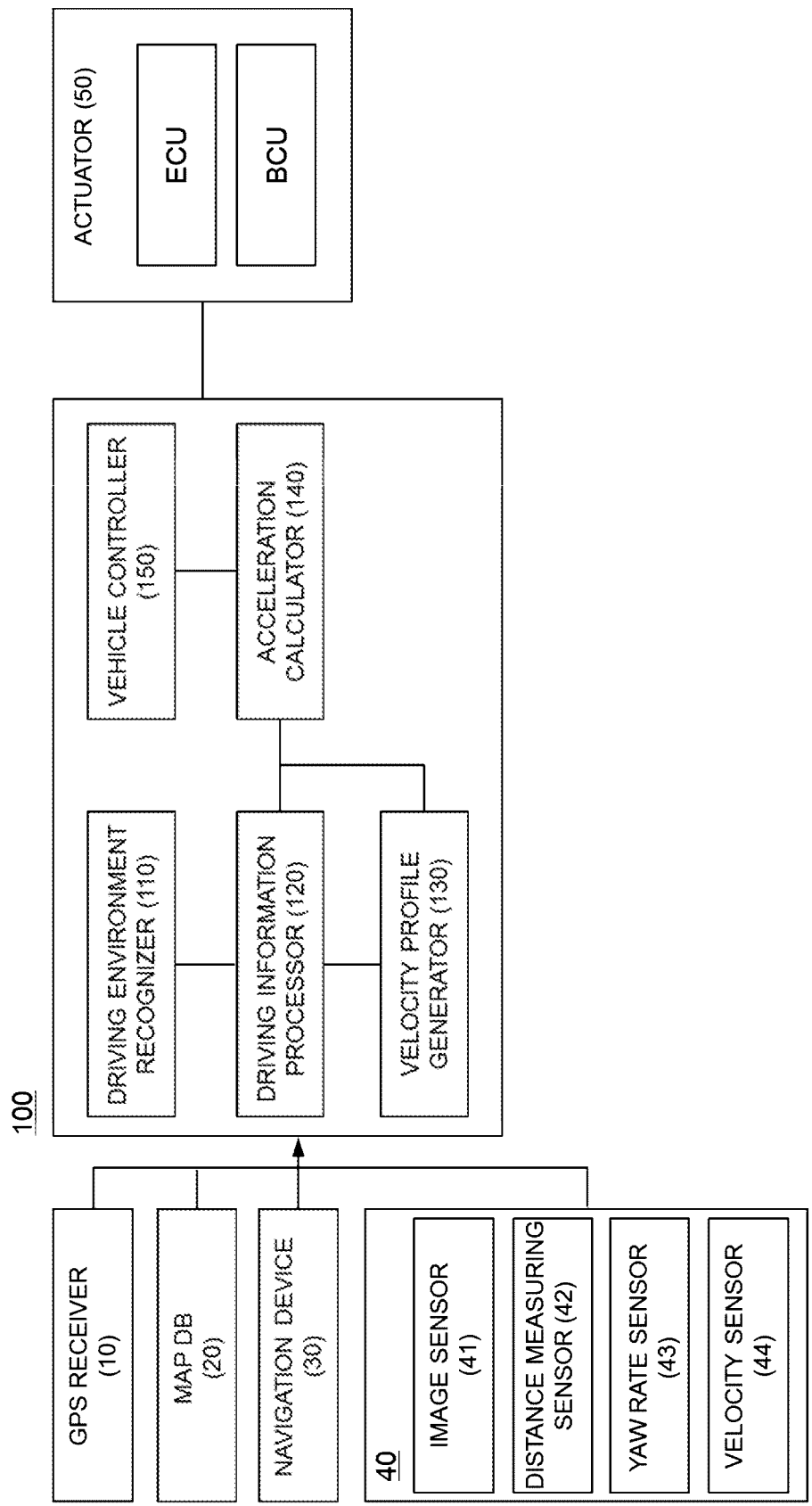

FIG. 5A
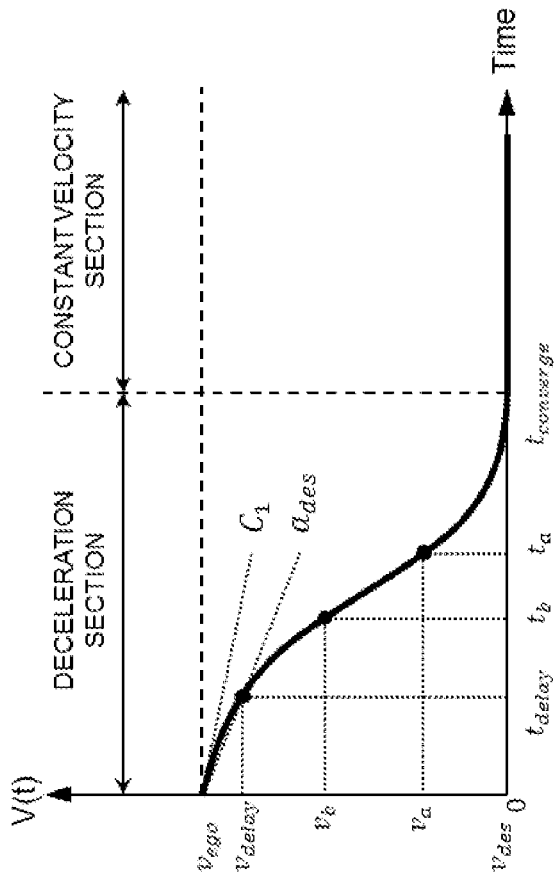
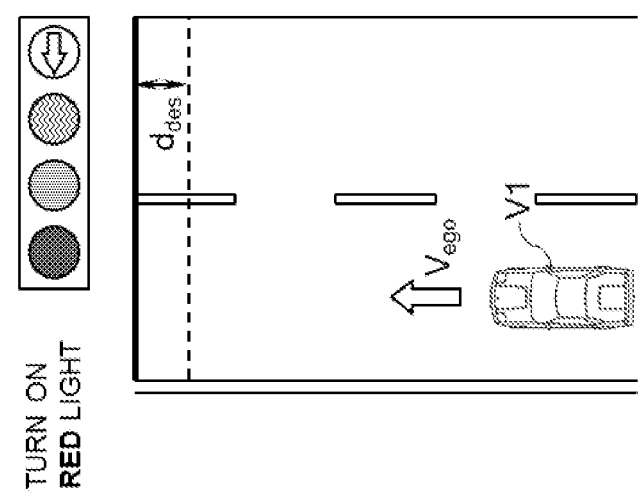

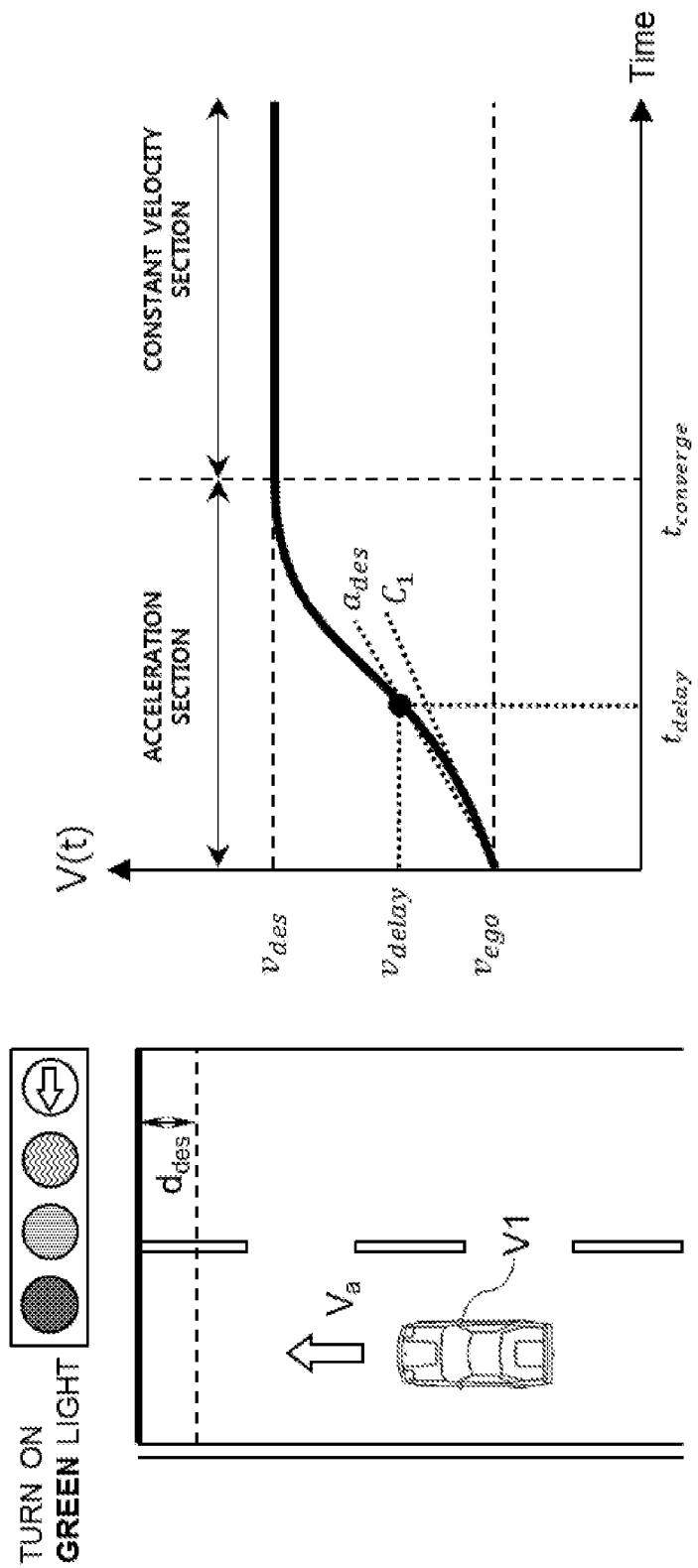

FIG. 6A
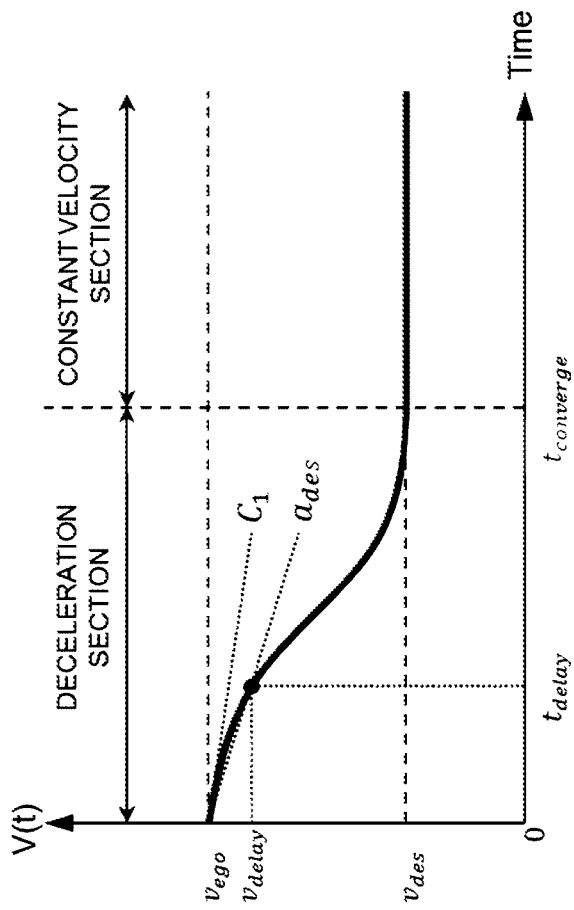
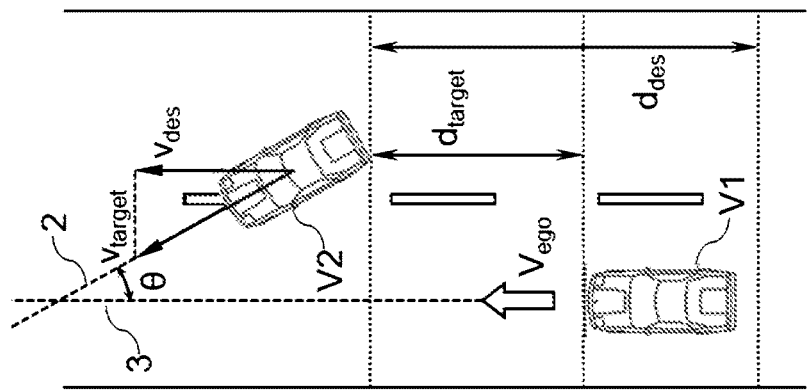

FIG. 6B
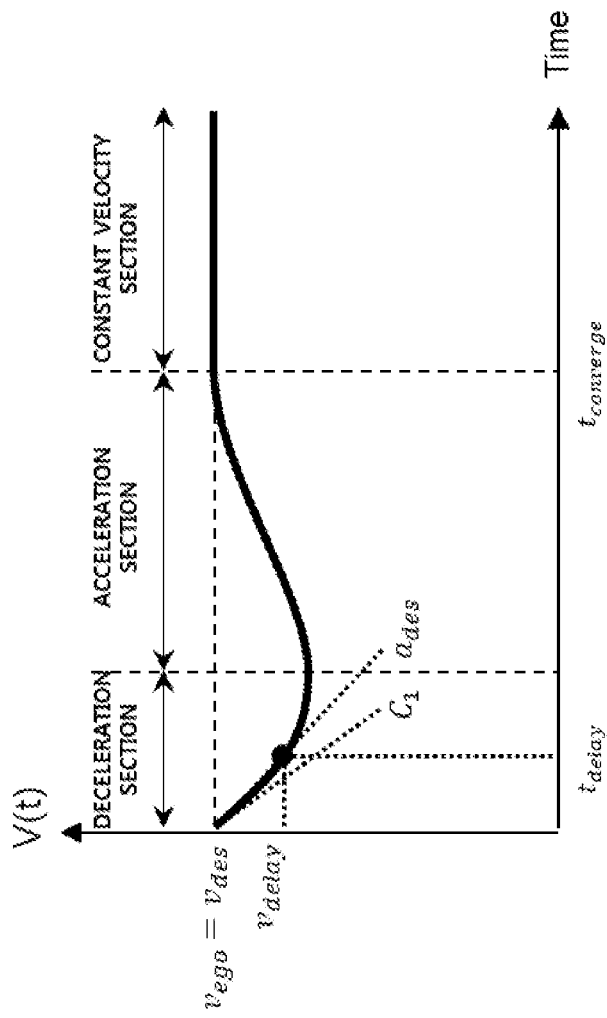
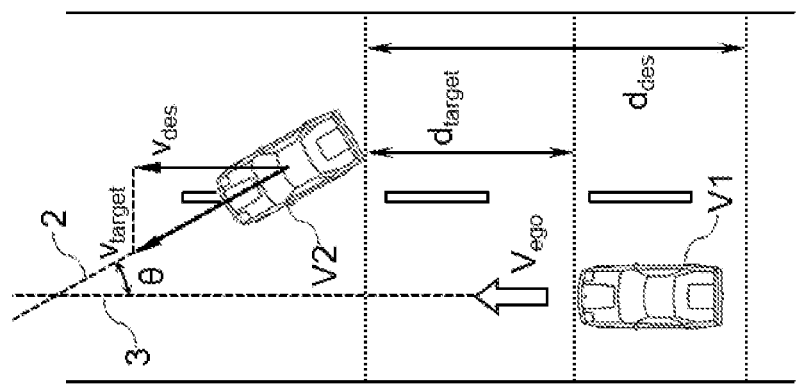

FIG. 6C
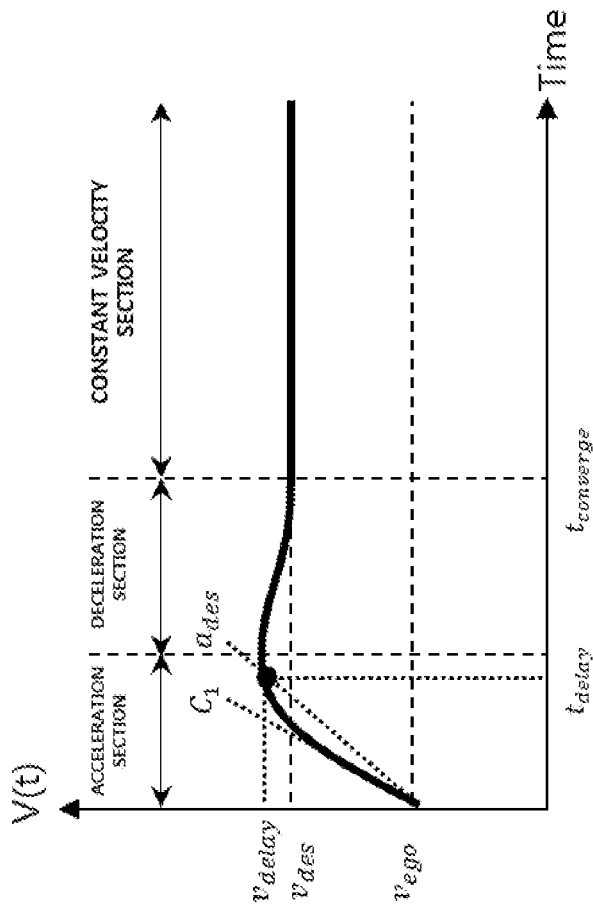
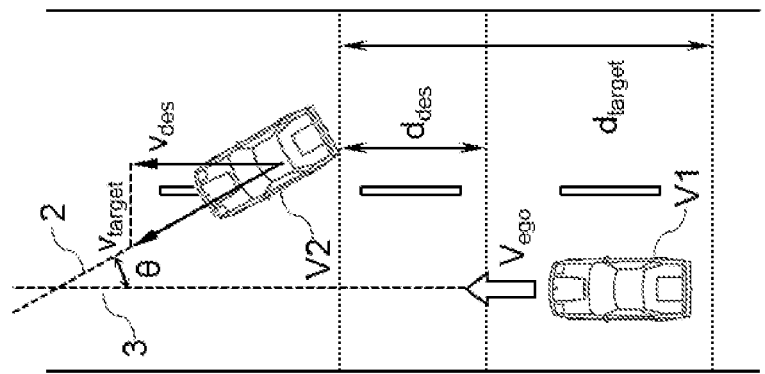

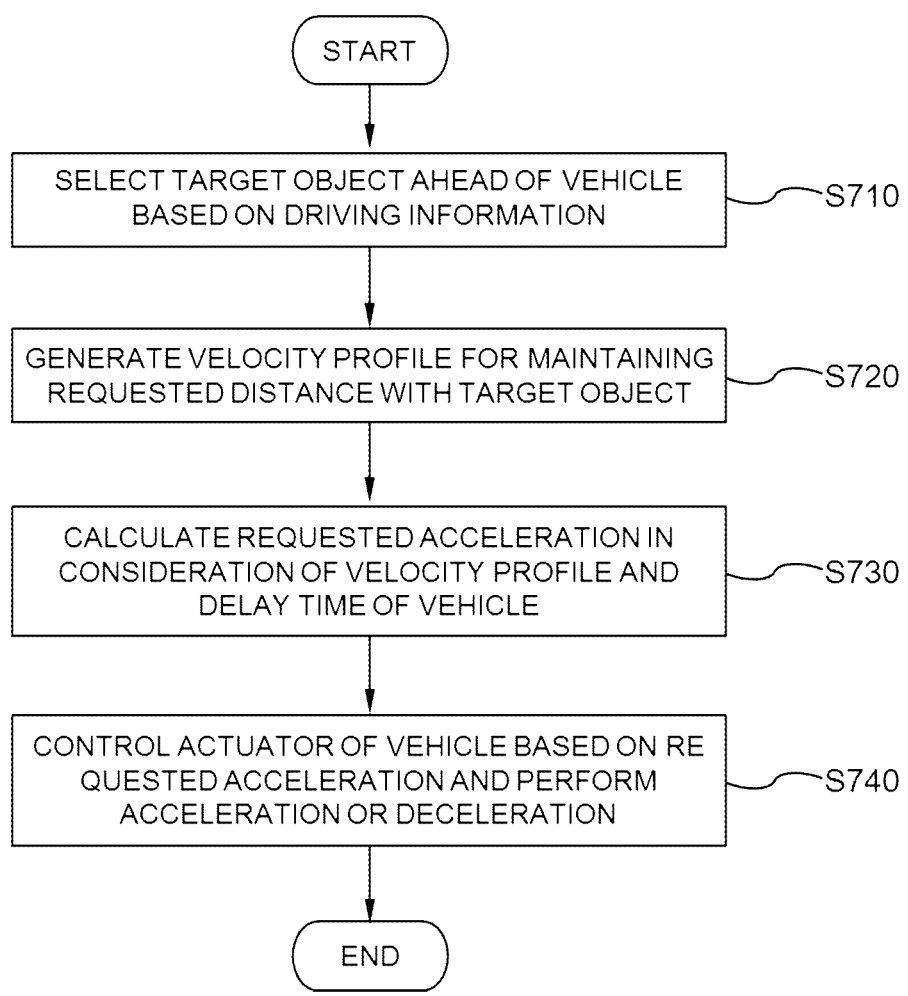

APPARATUS AND METHOD FOR CONTROLLING AUTONOMOUS DRIVING OF VEHICLE

CROSS-REFERENCE TO RELATED APPLICATION

This application claims priority to and the benefit of Korean Patent Application No. 10-2019-0169289, filed on Dec. 17, 2019, the entire contents of which are hereby incorporated by reference.

FIELD

The present disclosure relates to a control technology for maintaining a distance between vehicles of an autonomous vehicle, and more particularly, an apparatus and method for controlling autonomous driving of a vehicle.

BACKGROUND

The statements in this section merely provide background information related to the present disclosure and may not constitute prior art.

A conventional technology for maintaining a distance between vehicles is embodied through acceleration feedback control using a relative velocity and relative distance with a preceding vehicle. In particular, acceleration feedback control measures the relative velocity and the relative distance, multiplies the measured value with a proportional gain, an integral gain, and a differential gain (hereinafter, referred to as a 'control gain') that are predetermined in the form of proportional-integral-differential (PID) control to calculate a desired acceleration.

However, we have discovered that the conventional technology for maintaining a distance between vehicles is complicate in that a control gain needs to be differently set depending on a driving environment, and it is disadvantageous in that control is instable, for example, it is not possible to ensure avoidance of collision with a preceding vehicle when the control gain is not accurately tuned.

In addition, the control gain is a predetermined arbitrary value with respect to a non-determined future situation, there is a limit in flexibly handling various driving environments.

SUMMARY

The present disclosure is directed to an apparatus and method for controlling autonomous driving of a vehicle for applying a concept of a longitudinal acceleration and deceleration velocity profile based on a curve form based on a third order polynomial and a convergence time to correct a desired acceleration that is calculated according to a conventional technology of maintaining a distance between vehicles, thereby flexibly handing various driving situations while ensuring avoidance of collision with a preceding vehicle.

The technical problems solved by the forms are not limited to the above technical problems and other technical problems which are not described herein will become apparent to those skilled in the art from the following description.

In one form of the present disclosure, a method of controlling autonomous driving of a vehicle includes: selecting, by a driving environment recognizer, a target object ahead of the vehicle based on driving information; generating, by a velocity profile generator, a velocity profile for maintaining a desired distance to the target object from the vehicle; calculating, by an acceleration calculator, a desired acceleration based on the velocity profile and a delay time of the vehicle; and controlling, by a vehicle controller, an actuator of the vehicle based on the desired acceleration.

The method may further include: calculating, by a driving information processor, a target velocity of the vehicle based on a velocity limit of a road on which the vehicle travels and a velocity and a heading direction of the target object; and applying, by the driving information processor, a predetermined weight to a time to collision (TTC) between the vehicle and the target object and calculating a target convergence time.

The velocity profile may be classified into an acceleration and deceleration section and a constant velocity section based on the target convergence time as a boundary.

The generating the velocity profile may include generating a longitudinal acceleration and deceleration profile in a curve form based on a third order polynomial in consideration of a current velocity, the target velocity, and the target convergence time of the vehicle.

The generating the velocity profile may include determining an initial inclination of the longitudinal acceleration and deceleration profile using a velocity error between the current velocity and the target velocity of the vehicle, and a distance error between a relative distance and a desired distance to the target object.

The generating the velocity profile may include calculating coefficients for respective degree-terms of the third order polynomial based on a preset constraint condition, wherein the preset constraint condition may satisfy a condition in which a velocity at the target convergence time is the target velocity and a velocity inclination at the target convergence time is zero (0).

The calculating the desired acceleration may include extracting a reaction velocity corresponding to the delay time based on the longitudinal acceleration and deceleration profile, and calculating the desired acceleration using a vehicle velocity variation between the reaction velocity and the current velocity for the delay time.

The controlling the actuator of the vehicle may include maintaining a constant velocity of the vehicle depending on the target velocity after the target convergence time.

The target convergence time may be variably adjusted depending on a driving environment of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a block diagram showing an autonomous driving control apparatus of a vehicle in one form of the present disclosure;

FIGS. 5A, 5B, 5C and 5D are diagrams respectively showing an example of a longitudinal driving scenario of the case in which a traffic light is recognized through an autonomous driving control apparatus of a vehicle according to one form of the present disclosure;

FIGS. 6A, 6B and 6C are diagrams respectively showing an example of a longitudinal driving scenario of the case in which a preceding vehicle is recognized through an autonomous driving control apparatus of a vehicle in another form of the present disclosure; and FIG. 7 is a flowchart for explaining an autonomous driving control method of a vehicle according to one form of the present disclosure.

Figure 2A:
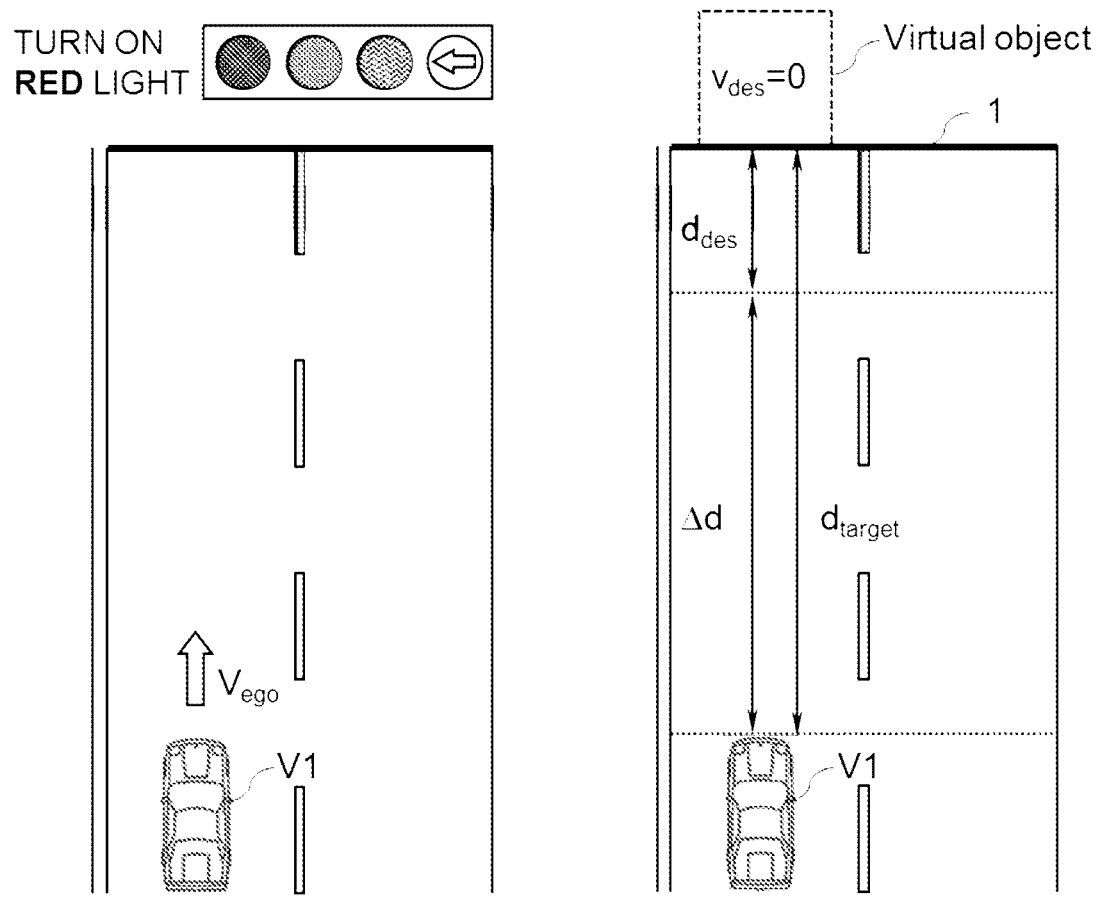
FIGS. 2A and 2B are diagrams for respectively explaining a method of calculating a desired distance, a target velocity, and a target convergence time, which are required to generate a velocity profile, according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the attached drawings. The forms may, however, be embodied in many alternate forms and the disclosure should not be construed as limited to the forms set forth herein. Accordingly, while the disclosure is susceptible to various modifications and alternative forms, specific forms thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the forms.

The terms such as "first" and "second" are used herein merely to describe a variety of constituent elements, but the constituent elements are not limited by the terms. The terms are used only for the purpose of distinguishing one constituent element from another constituent element. In addition, terms defined in consideration of configuration and operation of forms are used only for illustrative purposes and are not intended to limit the scope of the forms.

The terms used in the present specification are used for explaining a specific exemplary form, not limiting the present disclosure. Thus, the singular expressions in the present specification include the plural expressions unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an apparatus for controlling autonomous driving of a vehicle according to one form of the present disclosure will be described with reference to the accompanying drawings.

FIG. 1 is a block diagram showing an autonomous driving control apparatus of a vehicle according to one form of the present disclosure.

Referring to FIG. 1, the autonomous driving control apparatus 100 of a vehicle may include: a driving environment recognizer 110, a driving information processor 120, a velocity profile generator 130, an acceleration calculator 140, and a vehicle controller 150.

The driving environment recognizer 110 may collect driving information of the vehicle through various sensors installed in the vehicle, may recognize at least one driving environment of acceleration and deceleration based on the driving information, and may select a target object ahead of the vehicle.

Here, the driving information may include information on a light traffic ahead of the vehicle, information on a behavior (stoppage or movement) of a target object, a driving path, a driving lane, and a current velocity of the vehicle, a longitudinal relative distance between the vehicle and the target object, and the like.

The target object may include a preceding vehicle that already enters a driving lane or is supposed to enter the driving lane, a pedestrian, obstacle, or a virtual object generated at a position of a stop line of a road.

The various sensors may be embodied as, for example, a global positioning system (GPS) receiver 10, a map database (DB) 20, a navigation device 30, a sensor unit 40, or the like. However, this is exemplary and at least one of the aforementioned components is omitted or other components are additionally included. For example, information on a traffic light around the vehicle and information on a preceding vehicle may also be collected using vehicle to everything (V2X) communication.

The GPS receiver 10 may be a sensor configured to estimate a geolocation of the vehicle and may receive a navigation message from a GPS satellite positioned above the Earth and may collect the current position (which includes a latitude and a longitude) of the vehicle in real time.

The map DB 20 may store a high definition map obtained by recording road information in units of lanes in the form of a database (DB). The high definition map may contain geographic information, lane information, road surface information, position information of an object and a traffic sign, a road mark, and the like in a digital form, and may include road network data including a node and a node. The map DB 20 may be embodied as a storage medium such as a flash memory, a hard disk, a secure digital (SD) card, a random access memory (RAM), a read only memory (ROM), or a web storage, and may be automatically updated or may be manually updated by a user with a predetermined period using wireless communication.

Upon receiving a departure point and a destination from a user, the navigation device 30 may search for a driving path of the vehicle in consideration of path costs (a shortest distance, a minimum time, or the like) and may indicate the driving path on the high definition map to provide a path guidance service.

The sensor unit 40 may include an image sensor 41 and a distance measuring sensor 42, which detect information on a surrounding environment of the vehicle in real time, and a yaw rate sensor 43 and a velocity sensor 44, which measure information on a vehicle state.

The image sensor 41 may collect information on an image of a region around the vehicle, captured through an optical system, may identify color, and may perform image processing (noise removal, adjustment of image quality and chroma, file compression, or the like) on the information on the image to recognize a lane, a traffic light (which includes a signal form such as red, yellow, and green), an obstacle, or the like on a road.

The distance measuring sensor 42 may measure a distance between the vehicle and a measurement target, and for example, may be embodied as a radio detection and ranging (RADAR), a light detection and ranging (LIDAR), or the like. The RADAR may measure a distance, a direction, a relative velocity, an altitude, and the like of the obstacle positioned around the vehicle using electromagnetic waves, and may identify a long distance and may handle bad weather. The LIDAR may generate LIDAR data in the form of a point from a laser pulse reflected after a laser pulse is emitted toward a front side of the vehicle on a road, and may be used to detect an object present around the vehicle by virtue of precise resolution.

The yaw rate sensor 43 may measure a yaw rate of a vehicle that autonomously travels and the velocity sensor 44 may measure a driving velocity of the vehicle based on an output waveform of a wheel velocity of the vehicle, which is differentially acquired.

The GPS receiver 10, the map DB 20, the navigation device 30, and the sensor unit 40, which are described above, may communicate with the driving environment recognizer 110 through a vehicle network (NW) (not shown), and the vehicle network (NW) may include various in-vehicle communications such as a controller area network (CAN), CAN with flexible data rate (CAN-FD), FlexRay, media oriented systems transport (MOST), or time triggered Ethernet (TT Ethernet).

The driving environment recognizer 110 may recognize information on a traffic light ahead of the vehicle through the image sensor 41 and may determine whether the vehicle stops or passes at a stop line of a road and may generate a virtual object for control of stoppage. For example, the driving information processor 120 may generate a virtual preceding vehicle at a position of a stop line ahead of the vehicle.

The driving environment recognizer 110 may map the vehicle onto a driving path using the GPS receiver 10, the map DB 20, and the navigation device 30, and may combine information output from the sensor unit 40 to select a target object that enters or is supposed to enter the driving lane of the vehicle.

The driving information processor 120 may process driving information output from the driving environment recognizer 110, may set a target object and a predetermined distance (hereinafter, a 'desired distance') $d_{des}$ to be maintained during control of a vehicle in a longitudinal direction, and may calculate a target velocity $v_{des}$ of the vehicle for reaching the desired distance $d_{des}$ and a target convergence time $t_{converge}$ consumed to converge to the target velocity $v_{des}$.

The driving information processor 120 may set the desired distance $d_{des}$ in consideration of driver driving tendency (e.g., aggressive or defensive) as well as a minimum safety distance with a target object. In this case, the desired distance $d_{des}$ may be preset by a driver or may be set by learning the driver driving tendency during autonomous driving. The desired distance $d_{des}$ may be determined by applying a degree of risk (e.g., relative importance of collision risk due to a stop line, a pedestrian, and a preceding vehicle) of the recognized target object.

The driving information processor 120 may calculate the target velocity $v_{des}$ of the vehicle based on the velocity $v_{target}$ and a heading direction of the target object in consideration of a velocity limit $v_{limit}$ of a road, and the target velocity $v_{des}$ may be represented according to, for example, Equation 1 below.

$$v_{dec} = \min[v_{target} \cos \theta, v_{limit}] \quad \text{[Equation 1]}$$

As represented by Equation 1 above, the driving information processor 120 may determine a minimum value of a velocity limit $v_{limit}$ of a road and velocity $v_{target} \cos \theta$ projected onto a driving path of the vehicle in consideration of a heading direction of the velocity $v_{target}$ of the target object, as the target velocity $v_{des}$ of the vehicle. Here, $\theta$ is a deviation angle of the heading direction of the target object with respect to the driving path of the vehicle.

The driving information processor 120 may apply a predetermined weight R to a time to collision (TTC) between the vehicle and the target object to calculate a target convergence time $t_{converge}$, and the target convergence time $t_{converge}$ may be represented according to, for example, Equation 2 below.

$$t_{converage} = R \cdot TTC = \begin{cases} R \dfrac{d_{target}}{v_{ego} - v_{des}} & (\text{if, } v_{ego} > v_{des}) \\ R \dfrac{v_{des} - v_{ego}}{a_{max}} & (\text{if, } v_{ego} < v_{des}) \end{cases} \quad \text{[Equation 2]}$$

Here, the predetermined weight R may be a tuning coefficient of a time to collision (TTC) and may be variably adjusted in a range between 0 and 1 in consideration of the characteristics of a vehicle and a behavior of the target object in real time (0<R<1). For example, when a preceding vehicle that is attempting to change a lane to a surrounding lane from a driving lane releases the attempt halfway, the driving information processor 120 may reduce a value of R to reduce the target convergence time $t_{converge}$.

In this case, the driving information processor 120 may compare the current velocity $v_{ego}$ of the vehicle, acquired through the velocity sensor 44, with the target velocity $v_{des}$ of the vehicle, calculated according to Equation 1, to determine the time to collision (TTC).

For example, when the target velocity $v_{des}$ of the vehicle is lower than the current velocity $v_{ego}$, the driving information processor 120 may calculate a time to collision (TTC) through a ratio of a longitudinal relative distance $d_{target}$ between the vehicle and the target object to a vehicle error (or a longitudinal relative velocity) between the current velocity $v_{ego}$ and the target velocity $v_{des}$ of the vehicle.

When the target velocity $v_{des}$ of the vehicle is higher than the current velocity $v_{ego}$, the driving information processor 120 may calculate a time to collision (TTC) through a ratio of a velocity error between the target velocity $v_{des}$ and the current velocity $v_{ego}$ of the vehicle to the maximum acceleration $a_{max}$ of the vehicle.

In order to gain a sufficient understanding of the desired distance, the desired distance, the target velocity, and the target convergence time, which are set and calculated by the driving information processor 120, will be described below with reference to FIG. 2.

Figure 2B:
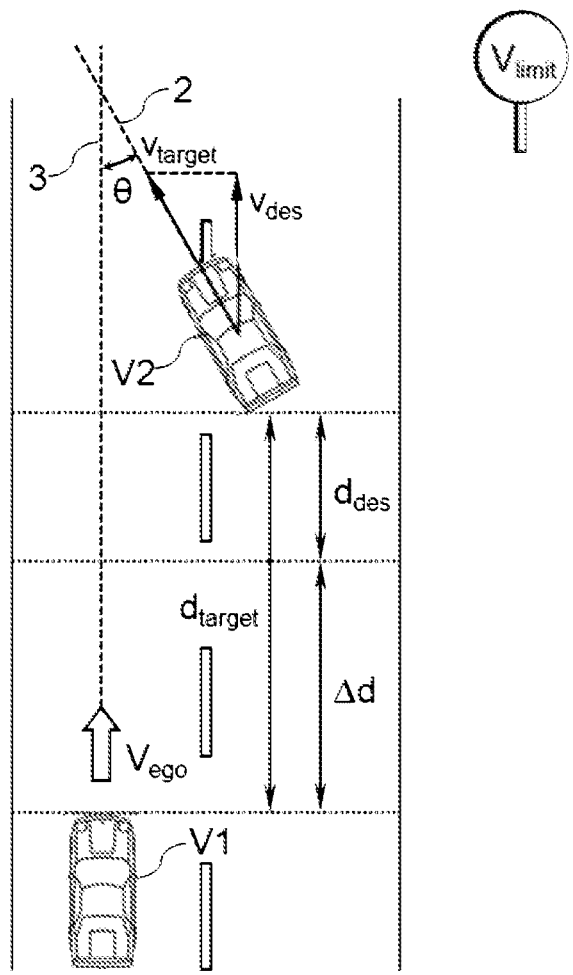

FIGS. 2A and 2B are diagrams for explaining a method of calculating a desired distance, a target velocity, and a target convergence time, which are required to generate a velocity profile, according to one form of the present disclosure.

Referring to FIG. 2A, when recognizing red signal information through a traffic light ahead of a vehicle V1, the driving environment recognizer 110 may generate a virtual object at a position of a stop line 1 of a road, and the driving information processor 120 may consider the virtual object to be in a stop state.

The driving information processor 120 may set a desired distance $d_{des}$ with the virtual object and may calculate a target velocity $v_{des}$ of the vehicle V1 for reaching the desired distance does based on a behavior of the virtual object. For example, the virtual object is in a stop state, and thus, the target velocity $v_{des}$ of the vehicle V1 may be set to 0.

The driving information processor 120 may calculate the target convergence time $t_{converge}$ using the relative distance $d_{target}$ between the vehicle V1 and the virtual object, collected through the distance measuring sensor 42, and a longitudinal relative velocity between the current velocity $v_{ego}$ and the target velocity $v_{des}$ of the vehicle V1.

Referring to FIG. 2B, when detecting a preceding vehicle V2 that is supposed to enter a driving lane ahead of the vehicle V1, the driving information processor 120 may set the desired distance dries with respect to the preceding vehicle V2 and may calculate the target velocity $v_{des}$ of the vehicle V1 in consideration of the velocity $v_{target}$ of the preceding vehicle V2. In this case, the target velocity $v_{des}$ may be determined based on the velocity $v_{target}$ cos θ projected onto a driving path 3 of the vehicle V1 in consideration of a heading direction 2 of the velocity $v_{target}$ of the preceding vehicle V2 and may be determined in consideration of the velocity limit $v_{limit}$ of the road. Here, θ is a deviation angle of the heading direction 2 of the target object.

The driving information processor 120 may calculate the target convergence time $t_{converge}$ using a longitudinal relative velocity between the target velocity $v_{des}$ and the current velocity $v_{ego}$ of the vehicle V1 and the relative distance $d_{target}$ with respect to the preceding vehicle V2 or the maximum acceleration $a_{max}$ of the vehicle V1.

The velocity profile generator 130 may generate a velocity profile for maintaining a desired distance with respect to the target object. In this case, the velocity profile may be classified into an acceleration and deceleration section and a constant velocity section based on the target convergence time $t_{converge}$ as a boundary, and the velocity profile generator 130 may generate a longitudinal acceleration and deceleration profile in a curve form based on a third order polynomial in consideration of the current velocity $v_{ego}$, the target velocity $v_{des}$, and the target convergence time $t_{converge}$ of the vehicle, which will be described in more detail with reference to FIGS. 3A-3B.

Figure 3A:
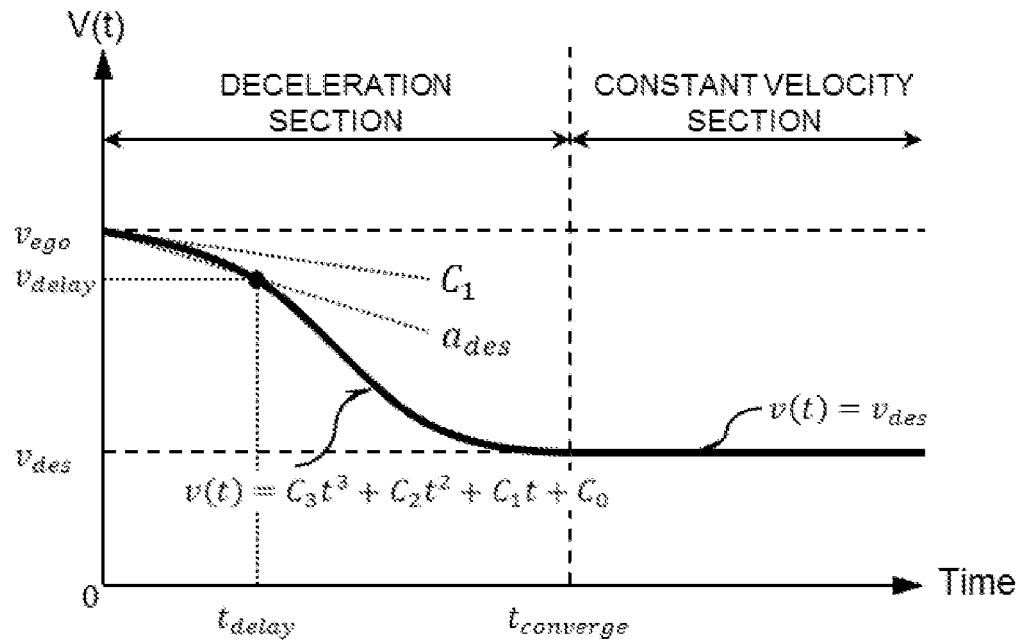
FIGS. 3A and 3B are diagrams for respectively explaining a velocity profile generated by an autonomous driving control apparatus of a vehicle according to another form of the present disclosure.
Figure 3B:
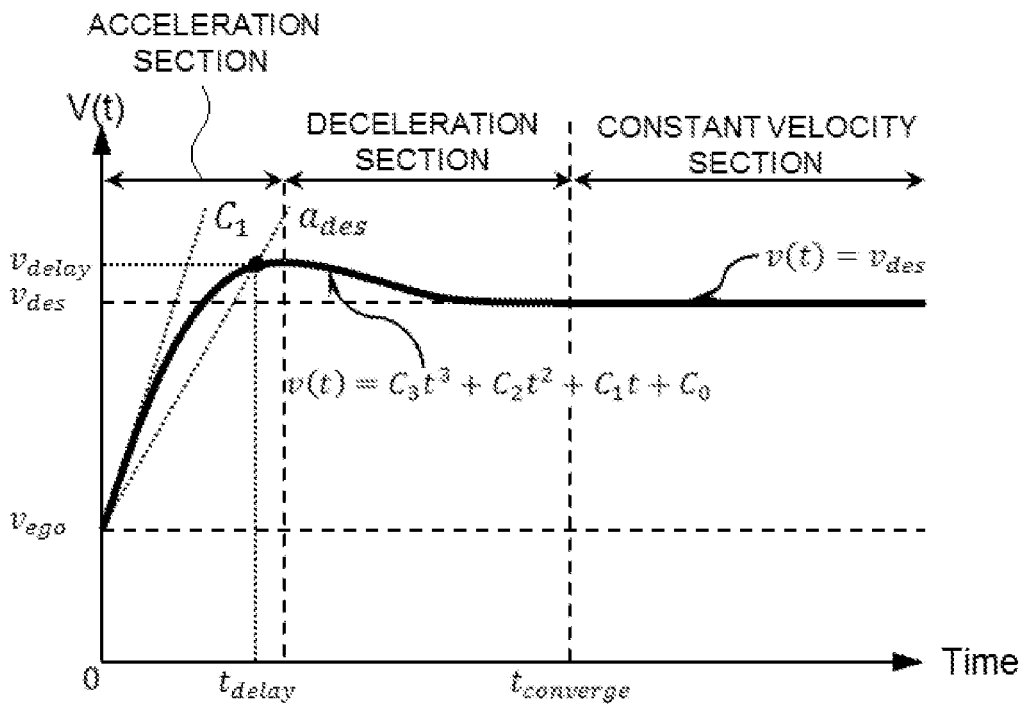

FIGS. 3A and 3B are diagrams for explaining a velocity profile generated by an autonomous driving control apparatus of a vehicle according to another form of the present disclosure.

FIG. 3A shows a longitudinal deceleration profile when a target velocity of the vehicle is lower than a current velocity. FIG. 3B shows a longitudinal acceleration profile when the target velocity of the vehicle is higher than the current velocity. Here, the x axis of the velocity profile indicates a time, the y axis of the velocity profile indicates a velocity, and a time corresponding to the current velocity $v_{ego}$ of the vehicle is assumed to be 0.

Referring to both FIGS. 3A and 3B, the velocity profile generator 130 may generate a velocity profile including a deceleration (or acceleration) section and a constant velocity section based on the target convergence time $t_{converge}$ as a boundary, and the velocity profile may be represented according to Equation 3 below.

$$v(t) = \begin{cases} C_3 t^3 + C_2 t^2 + C_1 t + C_0 & (\text{if, } t \leq t_{converge}) \\ v_{des} & (\text{if, } t > t_{converge}) \end{cases} \quad [\text{Equation 3}]$$

As shown in Equation 3 above, the velocity profile generator 130 may control an acceleration and deceleration motion of the vehicle according to a longitudinal acceleration and deceleration profile before $t_{converge}$ is reached, and may control uniform motion of the vehicle to follow the target velocity $v_{des}$ after the $t_{converge}$ is reached.

The velocity profile generator 130 may generate a longitudinal acceleration and deceleration profile in a curve form based on a third order polynomial in consideration of the current velocity $v_{ego}$, the target velocity $v_{des}$, and the target convergence time $t_{converge}$ of the vehicle, which are output through the driving information processor 120. However, this is exemplary and the scope of the present disclosure is not limited thereto, and thus, the longitudinal acceleration and deceleration profile may be generated based on an $n^{th}$ degree polynomial (where n is a natural number equal to or more than 4).

In this case, the velocity profile generator 130 may determine an initial inclination $C_1$ of a longitudinal acceleration and deceleration profile, and may calculate coefficients $C_0$, $C_2$, and $C_3$ for respective degree-terms of a third order polynomial depending on a preset constraint condition to generate a longitudinal acceleration and deceleration profile.

The velocity profile generator 130 may calculate the initial inclination $C_1$ using a velocity error between the current velocity $v_{ego}$ and the target velocity $v_{des}$ of the vehicle, and a distance error Δd between the desired distance $d_{des}$ and the relative distance $d_{target}$ with the target object according to Equation 4 below.

$$C_1 = -K_v(v_{ego} - v_{des}) + K_d(d_{target} - d_{des}) \quad [\text{Equation 4}]$$

Here, $v_{ego}$ is a current velocity of a vehicle, $v_{des}$ is a target velocity of the vehicle, $d_{target}$ is a relative distance with a target object, $d_{des}$ is a desired distance with the target object, $K_v$ is a vehicle gain, and $K_d$ is a distance gain.

The velocity profile generator 130 may calculate coefficients $C_0$, $C_2$, $C_3$ for respective degree-terms of a third order polynomial depending on a preset constraint condition at t=0 and $t_{converge}$ according to Equation 5 below. Here, the preset constraint condition may satisfy a condition in which a velocity at t=0 is the current velocity $v_{ego}$ of the vehicle, a velocity at the target convergence time $t_{converge}$ is the target velocity $v_{des}$ of the vehicle, and a velocity inclination at the target convergence time $t_{converge}$ is 0.

$$C_0 = v(0) = v_{ego} \quad [\text{Equation 5}]$$

-continued $$C_3 = \frac{-2v_{des} + 2C_0 + C_1 t_{converge}}{(t_{converge})^3}$$

$$C_2 = \frac{C_1 + 3C_3(t_{converge})^2}{-2t_{converge}}$$

The velocity profile generator 130 may calculate a third order polynomial according to Equations 4 and 5 and may generate a longitudinal acceleration and deceleration profile in a curve form corresponding to an acceleration and deceleration section between t=0 and t=$t_{converge}$ based on the third order polynomial. In this case, the target convergence time $t_{converge}$ may be variably adjusted depending on the characteristics of the vehicle and a change in a behavior of the target object, and thus, the curve of the longitudinal acceleration and deceleration profile may also be changed.

The velocity profile generator 130 may allow a constant velocity of the vehicle to converge to the target convergence time $t_{converge}$ through the velocity profile classified into the acceleration and deceleration section and the constant velocity section, and thus, may ensure avoidance of collision with the target object.

The acceleration calculator 140 may calculate the desired acceleration aces in consideration of the generated longitudinal acceleration and deceleration profile and a delay time $t_{delay}$ of the vehicle. Here, the delay time $t_{delay}$ of the vehicle is a time taken for the vehicle to actually behave in response to a velocity control command applied to an actuator 50 from the vehicle controller 150 that will be described below. For example, the acceleration calculator 140 may measure a time between a time of executing the velocity control command by the vehicle controller 150 and a response time received from at least one vehicle wheel included in the vehicle to extract the delay time $t_{delay}$. In addition, the acceleration calculator 140 may also measure a time of supplying a driving pressure or a brake pressure from an engine control unit (ECU) or a brake control unit (BCU) of the vehicle controller 150 to extract the delay time $t_{delay}$.

Referring to FIGS. 3A and 3B, the acceleration calculator 140 may read the longitudinal acceleration and deceleration profile generated through the velocity profile generator 130 and may extract a reaction velocity $v_{delay}$ corresponding to the delay time $t_{delay}$ of the vehicle based on the longitudinal acceleration and deceleration profile. Here, the reaction velocity $v_{delay}$ is a velocity corresponding to the delay time $t_{delay}$ among arbitrary velocities on a curve based on a delay cubic equation.

The acceleration calculator 140 may acquire a vehicle velocity variation between the current velocity $v_{ego}$ and the reaction velocity $v_{delay}$ of the vehicle during the delay time $t_{delay}$ to calculate a desired acceleration $a_{des}$ for outputting the vehicle velocity variation to the vehicle controller 150 according to Equation 6 below.

$$a_{des} = \frac{v_{delay} - v_{ego}}{t_{delay}} \quad \text{[Equation 6]}$$

As such, the acceleration calculator 140 may set the desired acceleration $a_{des}$ to be less than the initial inclination $C_1$ in consideration of the delay time $t_{delay}$ of the vehicle, and thus, may respond to an uncertain situation that occurs in the future by a minimum degree. Accordingly, during deceleration or acceleration, the acceleration calculator 140 may rapidly respond to a change in behavior of the target object.

The acceleration calculator 140 according to another form may also calculate the desired acceleration $a_{des}$ using a multiple point but not a single point, which will be described with reference to FIG. 4.

Figure 4:
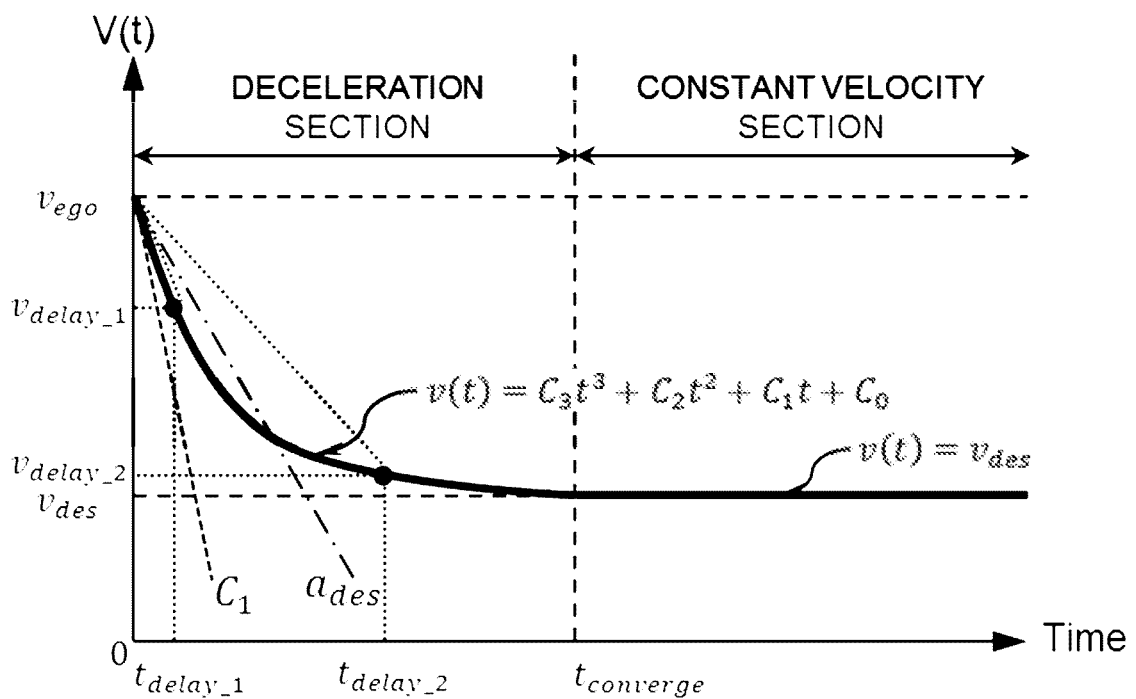
FIG. 4 is a diagram for explaining a method of calculating a desired acceleration by an autonomous driving control apparatus of a vehicle in another form of the present disclosure.

FIG. 4 is a diagram for explaining a method of calculating a desired acceleration by an autonomous driving control apparatus of a vehicle according to another form of the present disclosure.

FIG. 4 shows another example of a longitudinal deceleration profile, and a shape of a curve thereof may be changed depending on coefficients for respective degree-terms of a third order polynomial. For example, compared with the longitudinal deceleration profile illustrated in FIG. 3, in the longitudinal deceleration profile illustrated in FIG. 4, the initial inclination $C_1$ and the coefficients for respective degree-terms of the deceleration profile may be differently calculated to form different shapes of the curve due to a difference of the current velocity $v_{ego}$, the target velocity $v_{des}$, and the target convergence time $t_{converge}$ of the vehicle depending on a driving environment.

Referring to FIG. 4, the acceleration calculator 140 may extract a multiple point of the deceleration profile to calculate the desired acceleration $a_{des}$ according to Equation 7 below.

$$a_{des} = \alpha \frac{v_{delay\_1} - v_{ego}}{t_{delay\_1}} + \beta \frac{v_{delay\_2} - v_{ego}}{t_{delay\_2}} \quad \text{[Equation 7]}$$

Here, $t_{delay\_1}$ is a first delay time of a vehicle, $t_{delay\_2}$ is a second delay time of the vehicle, $v_{delay\_1}$ is a first reaction velocity corresponding to the first delay time, $v_{delay\_2}$ is a second reaction velocity corresponding to the second delay time, $v_{ego}$ is a current velocity of the vehicle, and $\alpha$ and $\beta$ are weights for respective parameters.

As such, the acceleration calculator 140 may set the desired acceleration $a_{des}$ using a multiple point, thereby enhancing the reliability of control of autonomous driving with respect to an uncertain situation that occurs in the future.

The vehicle controller 150 may transfer the driving pressure or the brake pressure based on the desired acceleration $a_{des}$ output from the acceleration calculator 140 to the actuator 50 and may control acceleration or deceleration of the vehicle.

The actuator 50 may include an engine control unit (ECU) that performs acceleration of the vehicle, and a brake control unit (BCU) that performs deceleration, and may receive the desired acceleration transferred from the vehicle controller 150 and may control an engine and brake of the vehicle.

Hereinafter, a longitudinal control method of a vehicle through an autonomous driving control apparatus of a vehicle according to one form will be described with reference to FIGS. 5 and 6.

FIGS. 5A-5D are diagrams respectively showing an example of a longitudinal driving scenario of the case in which a traffic light is recognized through an autonomous driving control apparatus of a vehicle in one form of the present disclosure.

Figure 5C:
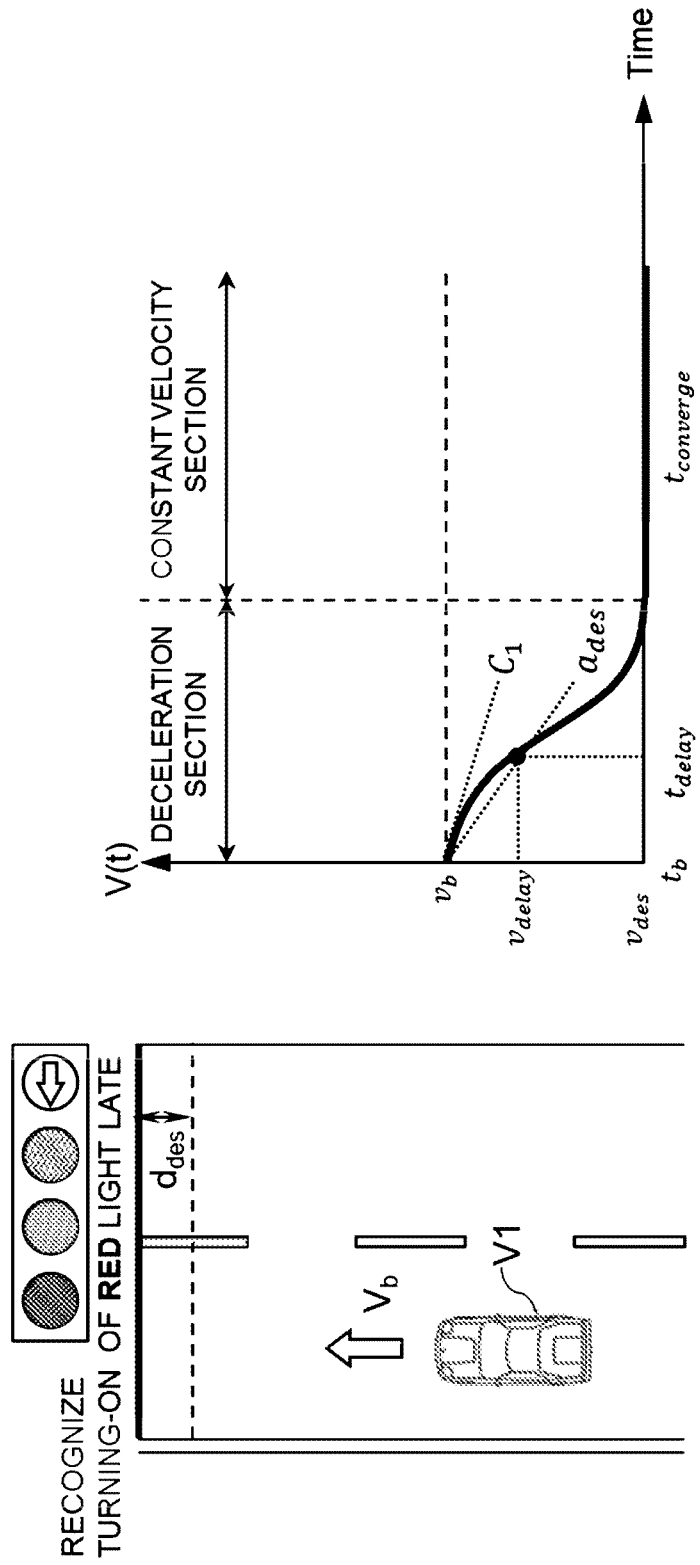
Figure 5D:
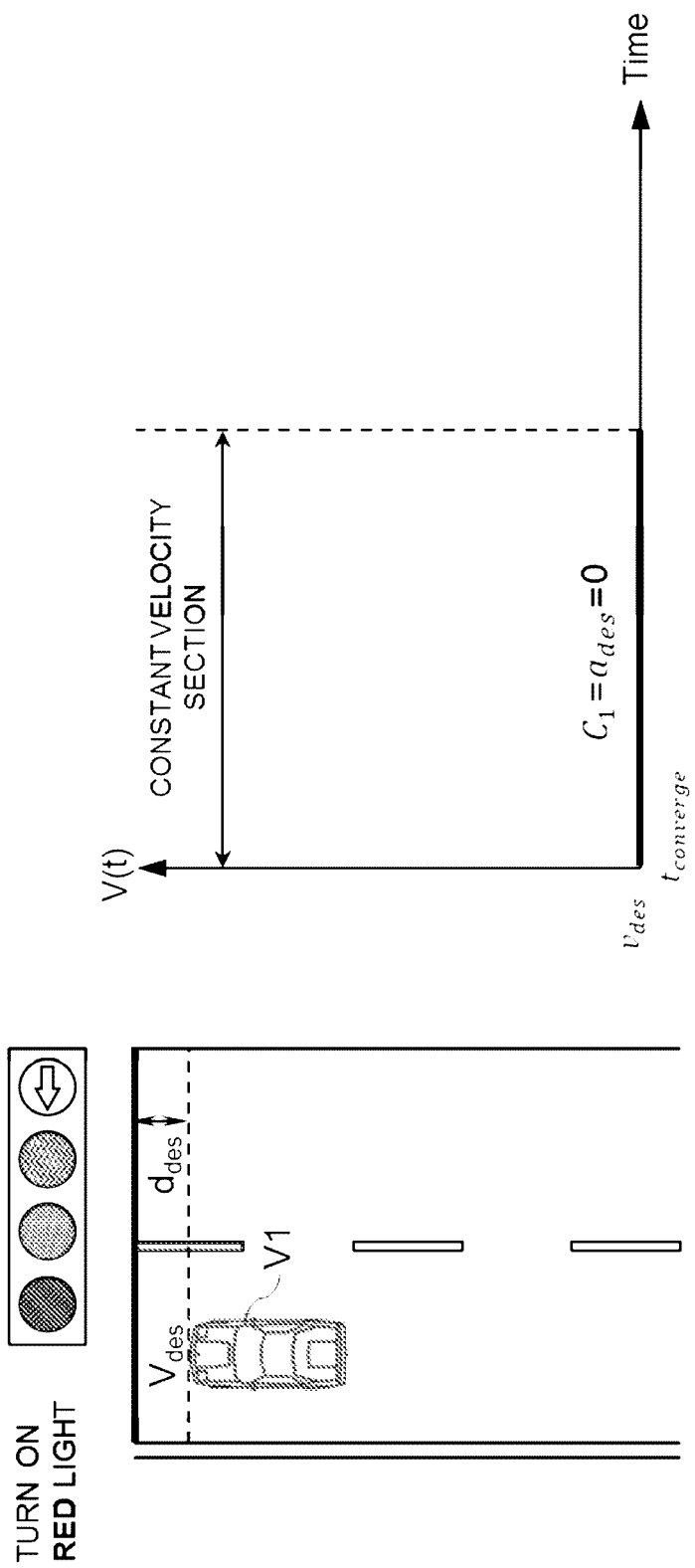

FIG. 5A shows a longitudinal driving scenario of the case in which red signal information is recognized at a long distance, FIG. 5B shows a longitudinal driving scenario of the case in which green signal information is recognized during deceleration according to the velocity profile illustrated in FIG. 5A, FIG. 5C shows a longitudinal driving scenario of the case in which red signal information is recognized late when the velocity profile illustrated in FIG. 5A is generated, and FIG. 5D shows a longitudinal driving scenario of the case in which the vehicle is completely stopped depending on the velocity profile illustrated in FIG. 5C.

Referring to FIG. 5A, when the red signal information is recognized at a long distance, the velocity profile generator 130 may generate a deceleration profile for stopping the vehicle at the target convergence time $t_{converge}$. The target velocity $v_{des}$ of the vehicle may be set at the target convergence time $t_{converge}$, and the desired deceleration $a_{des}$ may also be determined in consideration of the delay time $t_{delay}$ of the vehicle.

Referring to FIG. 5B, when the green signal information is recognized at a time $t_a$ during deceleration of the vehicle according to the velocity profile illustrated in FIG. 5B, the velocity profile generator 130 may reset the target velocity $v_{des}$ of the vehicle using information on a behavior of a new target object ahead of the vehicle, and when the target velocity $v_{des}$ is higher than the current velocity $v_{ego}$, the velocity profile generator 130 may generate an acceleration profile. When the target convergence time $t_{converge}$ is long, the acceleration profile may be compensated for to reduce the desired acceleration $a_{des}$, and when the target convergence time $t_{converge}$ is short, the acceleration profile may be compensated for to increase the desired acceleration $a_{des}$, thereby flexibly handling the change in the behavior of the target object.

Referring to FIG. 5C, when it is determined that a velocity of the vehicle is not sufficiently reduced or the red signal information is recognized late at a time $t_b$ during deceleration of the vehicle according to the velocity profile illustrated in FIG. 5A, the deceleration profile may be moved to reduce the target convergence time $t_{converge}$ and may be compensated for to increase the desired deceleration $a_{des}$, and thus, autonomous driving may be controlled to rapidly decelerate the vehicle.

Referring to FIG. 5D, when the vehicle needs to be completely stopped, the velocity profile may set both the initial inclination $C_1$ and the desired acceleration $a_{des}$ to be 0 and may maintain a stop state.

FIGS. 6A-6C are diagrams respectively showing an example of a longitudinal driving scenario of the case in which a preceding vehicle is recognized through an autonomous driving control apparatus of a vehicle according to another form of the present disclosure.

FIG. 6A shows a longitudinal driving scenario of the case in which the target velocity $v_{des}$ of the vehicle with respect to the preceding vehicle V2 in a driving path is lower than the current velocity $v_{ego}$ and the relative distance $d_{target}$ with the preceding vehicle V2 is lower than the desired distance $d_{des}$, FIG. 6B shows a longitudinal driving scenario of the case in which the target velocity $v_{des}$ of the vehicle with respect to the preceding vehicle V2 in the driving path is the same or similar to the current velocity $v_{ego}$ and the relative distance $d_{target}$ with the preceding vehicle V2 is smaller than the desired distance $d_{des}$, and FIG. 6C shows a longitudinal driving scenario of the case in which the target velocity $v_{des}$ of the vehicle with respect to the preceding vehicle V2 in the driving path is higher than the current velocity $v_{ego}$ and the relative distance $d_{target}$ with the preceding vehicle V2 is higher than the desired distance $d_{des}$.

Referring to FIG. 6A, when recognizing the preceding vehicle V2 that travels at a lower velocity than the vehicle V1 ahead of the vehicle V1, the velocity profile generator 130 may generate a deceleration profile for decelerating the vehicle to the target velocity $v_{des}$ at the target convergence time $t_{converge}$. The desired deceleration $a_{des}$ may be determined in consideration of the delay time $t_{delay}$ of the vehicle, and when immediate collision with the preceding vehicle V2 is expected due to a short target convergence time $t_{converge}$, the deceleration profile may be compensated for to increase the desired deceleration $a_{des}$ to avoid collision with the preceding vehicle V2.

Referring to FIG. 6B, upon recognizing the preceding vehicle V2 that travels at the same velocity as the vehicle V1 ahead of the vehicle V1, the velocity profile generator 130 may temporally decelerate the vehicle and may then generate a deceleration and acceleration profile for allowing the target velocity $v_{des}$ of the vehicle to converge to the current velocity $v_{ego}$ at the target convergence time $t_{converge}$. In this case, the target convergence time $t_{converge}$ may be increased, and the deceleration and acceleration profile may be compensated for to reduce the desired deceleration $a_{des}$ to avoid collision with the preceding vehicle V2.

Referring to FIG. 6C, when recognizing the preceding vehicle V2 that travels at a higher velocity than the vehicle V1 ahead of the vehicle V1, the velocity profile generator 130 may generate an acceleration profile for accelerating the vehicle to the target velocity $v_{des}$ at the target convergence time $t_{converge}$. The desired deceleration $a_{des}$ may be determined in consideration of the delay time $t_{delay}$ of the vehicle, and the target convergence time $t_{converge}$ may be adjusted, and thus, the acceleration profile may be compensated for to allow the target convergence time $t_{converge}$ to rapidly converge or to slowly converge, thereby flexibly handling the change in the behavior of the preceding vehicle V2.

Hereinafter, an autonomous driving control method in one form of the present disclosure will be described with reference to FIG. 7.

FIG. 7 is a flowchart for explaining an autonomous driving control method of a vehicle according to one form of the present disclosure.

Referring to FIG. 7, the autonomous driving control method of the vehicle may include operation S710 of selecting a target object ahead of the vehicle based on driving information, operation S720 of generating a velocity profile for maintaining a desired distance with the target object, operation S730 of calculating a desired acceleration in consideration of the velocity profile and a delay time of the vehicle, and operation S740 of controlling an actuator of the vehicle based on the desired acceleration to perform acceleration or deceleration.

In operation S710, the autonomous driving control apparatus 100 may recognize information on a traffic light ahead of the vehicle through the image sensor 41 to determine whether the vehicle stops or passes at a stop line of a road and may generate a virtual object for control of stoppage. The autonomous driving control apparatus 100 may map the vehicle onto the driving path using the GPS receiver 10, the map DB 20, and the navigation device 30, and may combine information output from the sensor unit 40 to select a target object (e.g., a preceding vehicle) that enters or is supposed to enter the driving lane of the vehicle.

In operation S720, the autonomous driving control apparatus 100 may process the driving information to set a desired distance with the target object and may calculate a target velocity of the vehicle for reaching the desired distance and a target convergence time consumed to converge the target velocity. This has been described above in detail with reference to FIG. 2, and thus, is not described for avoiding a repeated description.

In operation S720, the autonomous driving control apparatus 100 may generate a velocity profile including a deceleration (or acceleration) section and a constant velocity section based on the target convergence time as a boundary, and the longitudinal acceleration and deceleration profile in a curve form based on a third order polynomial may be generated in consideration of the current velocity, the target velocity, and the target convergence time of the vehicle. In this case, the autonomous driving control apparatus 100 may determine the initial inclination $C_1$ of the longitudinal acceleration and deceleration profile, and may calculate the coefficients $C_0$, $C_2$, and $C_3$ for respective degree-terms of a third order polynomial depending on a preset constraint condition to generate a longitudinal acceleration and deceleration profile. This has been described above in detail with reference to FIG. 3, and thus, is not described for avoiding a repeated description.

Then, in operation S730, the autonomous driving control apparatus 100 may read the longitudinal acceleration and deceleration profile, may extract a reaction velocity corresponding to the delay time of the vehicle, and may acquire a vehicle velocity variation between the reaction velocity and the current velocity of the vehicle during the delay time to calculate the desired acceleration.

In operation S740, the autonomous driving control apparatus 100 may transfer the driving pressure or the brake pressure based on the desired acceleration to the actuator and may control acceleration or deceleration of the vehicle.

Accordingly, according to at least one form of the present disclosure, a concept of a convergence time may be applied to generate a longitudinal acceleration and deceleration profile in a curve form based on a third order polynomial, and thus, avoidance of collision with a preceding vehicle may be ensured.

In addition, a desired acceleration may be calculated in consideration of a delay time (reactivity) of a vehicle to respond to an uncertain driving situation that occurs in the future, and a convergence time may be adjusted to increase and reduce the desired acceleration, thereby flexibly handing various driving situations.

It will be appreciated by persons skilled in the art that that the effects that could be achieved with the present disclosure are not limited to what has been particularly described hereinabove and other advantages of the present disclosure will be more clearly understood from the detailed description.

The aforementioned method of controlling autonomous driving of a vehicle may be prepared as a program to be executed in a computer and may be stored in a computer readable recording medium, and examples of the computer readable recording medium include read-only memory (ROM), random-access memory (RAM), CD-ROMs, magnetic tapes, hard disks, floppy disks, flash memory, optical data storage devices, and so on.

The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

Although some cases have been described above in relation to exemplary forms, the forms may be changed in various forms. The aforementioned technological features of the forms may be embodied in various forms as long as they are not incompatible, new forms may be embodied therethrough.

Those skilled in the art will appreciate that the present disclosure may be carried out in other specific ways than those set forth herein without departing from the spirit and characteristics of the present disclosure. The above forms are therefore to be construed in all aspects as illustrative and not restrictive.

What is claimed is:

1. A method of controlling autonomous driving of a vehicle, the method comprising:
    selecting, by a driving environment recognizer, a target object ahead of the vehicle based on driving information;
    generating, by a velocity profile generator, a velocity profile for maintaining a desired distance to the target object from the vehicle;
    calculating, by an acceleration calculator, a desired acceleration based on the velocity profile and a delay time of the vehicle;
    setting, by the acceleration calculator, the desired acceleration to be less than an initial inclination of a longitudinal acceleration and deceleration profile based on the delay time of the vehicle; and
    controlling, by a vehicle controller, an actuator of the vehicle based on the desired acceleration,
    wherein generating the velocity profile includes:
        calculating, by a driving information processor, a target velocity of the vehicle based on a velocity limit of a road on which the vehicle travels and a velocity and a heading direction of the target object; and
        applying, by the driving information processor, a predetermined weight to a time to collision (TTC) between the vehicle and the target object to calculate a target convergence time,
    wherein the velocity profile is classified into an acceleration and deceleration section and a constant velocity section based on the target convergence time,
    wherein the target convergence time is a time consumed to converge to the target velocity, and the predetermined weight is a tuning coefficient of a time to collision and variably adjusted in a range of zero (0) to 1 based on characteristics of a vehicle and a behavior of the target object in real time,
    wherein the desired distance is set in consideration of driver driving tendency as well as a minimum safety distance with the target object, and
    wherein the desired distance is set by learning the driver driving tendency during autonomous driving or is determined by applying a degree of risk to the target object.

2. The method of claim 1, wherein generating the velocity profile includes:
    generating the longitudinal acceleration and deceleration profile in a curve form based on a third order polynomial based on a current velocity, the target velocity, and the target convergence time of the vehicle.

3. The method of claim 2, wherein generating the velocity profile includes:
    determining the initial inclination of the longitudinal acceleration and deceleration profile using both a velocity error between the current velocity and the target velocity of the vehicle and a distance error between a relative distance and the desired distance to the target object.

4. The method of claim 2, wherein generating the velocity profile includes:
    calculating coefficients for respective degree-terms of the third order polynomial based on a preset constraint condition, wherein the preset constraint condition includes a condition that a velocity at the target convergence time is the target velocity and a velocity inclination at the target convergence time is zero (0).

5. The method of claim 2, wherein calculating the desired acceleration includes:
   extracting a reaction velocity corresponding to the delay time based on the longitudinal acceleration and deceleration profile; and
   calculating the desired acceleration using a vehicle velocity variation between the reaction velocity and the current velocity for the delay time.

6. The method of claim 1, wherein controlling the actuator includes:
   after the target convergence time, maintaining a constant velocity of the vehicle depending on the target velocity.

7. The method of claim 1, wherein the target convergence time is variably adjusted based on a driving environment of the vehicle.

8. A non-transitory computer-readable recording medium having a program recorded thereon, the program to direct a processor to perform acts of:
   selecting, by a driving environment recognizer, a target object ahead of a vehicle based on driving information;
   generating, by a velocity profile generator, a velocity profile for maintaining a desired distance to the target object from the vehicle;
   calculating, by an acceleration calculator, a desired acceleration based on the velocity profile and a delay time of the vehicle;
   setting, by the acceleration calculator, the desired acceleration to be less than an initial inclination of a longitudinal acceleration and deceleration profile based on the delay time of the vehicle; and
   controlling, by a vehicle controller, an actuator of the vehicle based on the desired acceleration,
   wherein generating the velocity profile includes:
      calculating, by a driving information processor, a target velocity of the vehicle based on a velocity limit of a road on which the vehicle travels and a velocity and a heading direction of the target object; and
      applying, by the driving information processor, a predetermined weight to a time to collision (TTC) between the vehicle and the target object to calculate a target convergence time,
   wherein the velocity profile is classified into an acceleration and deceleration section and a constant velocity section based on the target convergence time,
   wherein the target convergence time is a time consumed to converge to the target velocity, and the predetermined weight is a tuning coefficient of a time to collision and variably adjusted in a range of zero (0) to 1 based on characteristics of a vehicle and a behavior of the target object in real time,
   wherein the desired distance is set in consideration of driver driving tendency as well as a minimum safety distance with the target object, and
   wherein the desired distance is set by learning the driver driving tendency during autonomous driving or is determined by applying a degree of risk to the target object.

9. An apparatus for controlling autonomous driving of a vehicle, the apparatus comprising a processor configured to:
   select a target object ahead of the vehicle based on driving information;
   generate a velocity profile for maintaining a desired distance to the target object from the vehicle;
   calculate a desired acceleration based on the velocity profile and a delay time of the vehicle;
   set the desired acceleration to be less than an initial inclination of a longitudinal acceleration and deceleration profile based on the delay time of the vehicle;
   control an actuator of the vehicle based on the desired acceleration;
   calculate a target velocity of the vehicle based on a velocity limit of a road on which the vehicle travels, and a velocity and a heading direction of the target object; and
   apply a predetermined weight to a time to collision (TTC) between the vehicle and the target object to calculate a target convergence time,
   wherein the velocity profile is classified into an acceleration and deceleration section and a constant velocity section based on the target convergence time,
   wherein the target convergence time is a time consumed to converge to the target velocity, and the predetermined weight is a tuning coefficient of a time to collision and variably adjusted in a range of zero (0) to 1 based on characteristics of the vehicle and a behavior of the target object in real time,
   wherein the velocity profile generator processor is configured to set the desired distance in consideration of driver driving tendency as well as a minimum safety distance with the target object, and
   wherein the desired distance is set by learning the driver driving tendency during autonomous driving or is determined by applying a degree of risk to the target object.

10. The apparatus of claim 9, wherein the processor is configured to generate the longitudinal acceleration and deceleration profile in a curve form based on a third order polynomial based on a current velocity, the target velocity, and the target convergence time of the vehicle.

11. The apparatus of claim 10, wherein the processor is configured to determine the initial inclination of the longitudinal acceleration and deceleration profile using both a velocity error between the current velocity and the target velocity of the vehicle and a distance error between a relative distance and the desired distance to the target object.

12. The apparatus of claim 10, wherein the processor is configured to calculate coefficients for respective degree-terms of the third order polynomial based on a preset constraint condition, and
   wherein the preset constraint condition includes a condition that a velocity at the target convergence time is the target velocity and a velocity inclination at the target convergence time is zero (0).

13. The apparatus of claim 10, wherein the processor is configured to extract a reaction velocity corresponding to the delay time based on the longitudinal acceleration and deceleration profile and calculate the desired acceleration using a vehicle velocity variation between the reaction velocity and the current velocity for the delay time.

14. The apparatus of claim 9, wherein the processor is configured to maintain a constant velocity of the vehicle based on the target velocity after the target convergence time.

15. The apparatus of claim 9, wherein the target convergence time is variably adjusted based on a driving environment of the vehicle.

* * * * *

UNITED STATES PATENT AND TRADEMARK OFFICE
CERTIFICATE OF CORRECTION

PATENT NO. : 11,884,295 B2
APPLICATION NO. : 17/074993
DATED : January 30, 2024
INVENTOR(S) : Ki Cheol Shin Page 1 of 1

It is certified that error appears in the above-identified patent and that said Letters Patent is hereby corrected as shown below:

In the Claims

Claim 9, Column 16, Line 25 "velocity profile generator" should be removed

Signed and Sealed this
Twenty-seventh Day of February, 2024

Katherine Kelly Vidal
*Director of the United States Patent and Trademark Office*